Figures 2, 3, 4:
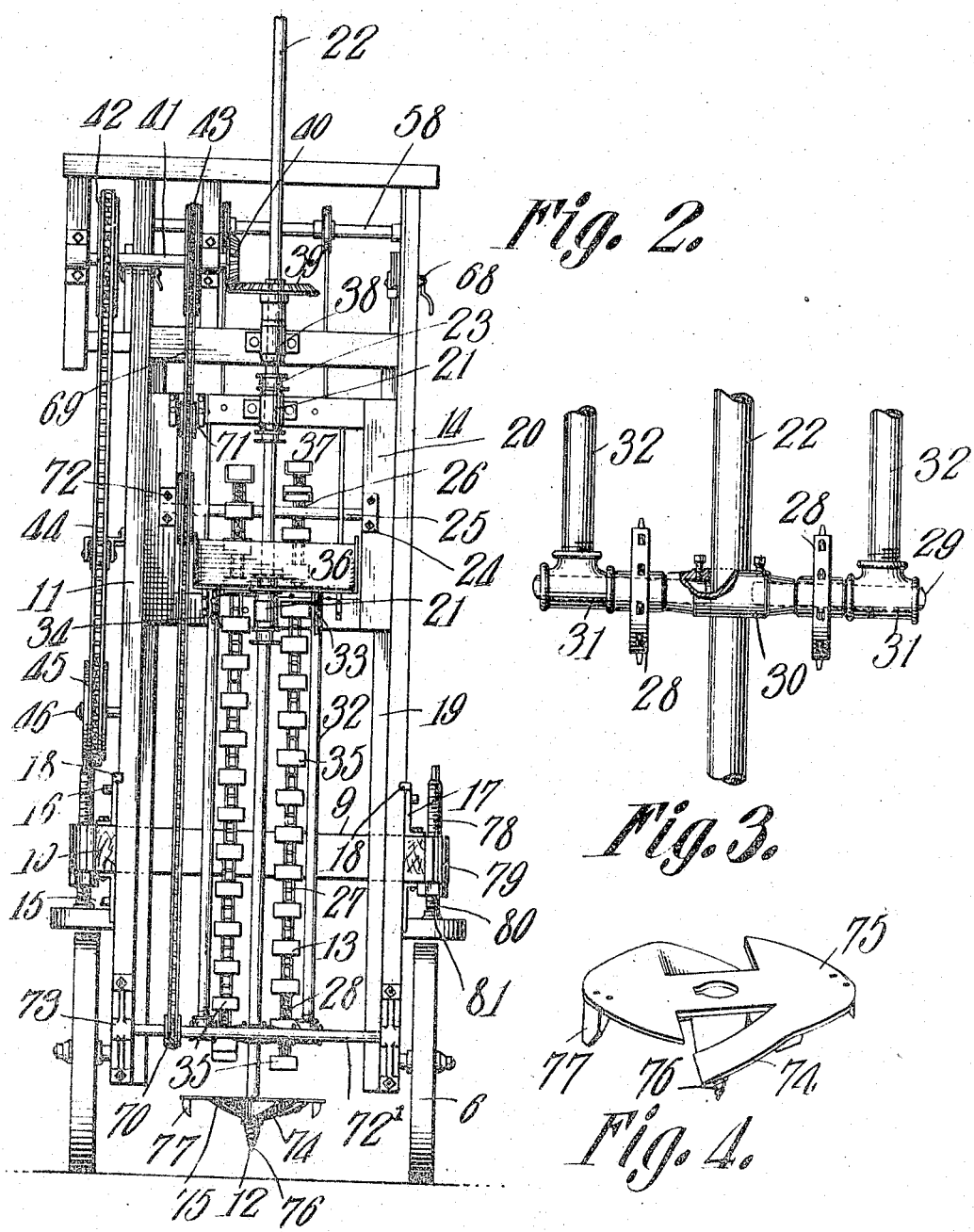

No. 885,041. PATENTED APR. 21, 1908.
R. GUTHRIE.
MACHINE FOR BORING POST HOLES.
APPLICATION FILED AUG. 24, 1907.

3 SHEETS—SHEET 1.

Fig. 1.

Witnesses

Inventor
Robert Guthrie
By C.A.Snow & Co
Attorneys

No. 885,041. PATENTED APR. 21, 1908.
R. GUTHRIE.
MACHINE FOR BORING POST HOLES.
APPLICATION FILED AUG. 24, 1907.

3 SHEETS—SHEET 2.

Witnesses

Inventor
Robert Guthrie
By Cashow & Co.
Attorneys

No. 885,041.  
R. GUTHRIE.  
MACHINE FOR BORING POST HOLES.  
APPLICATION FILED AUG. 24, 1907.
PATENTED APR. 21, 1908.
3 SHEETS—SHEET 3.
Fig. 5.
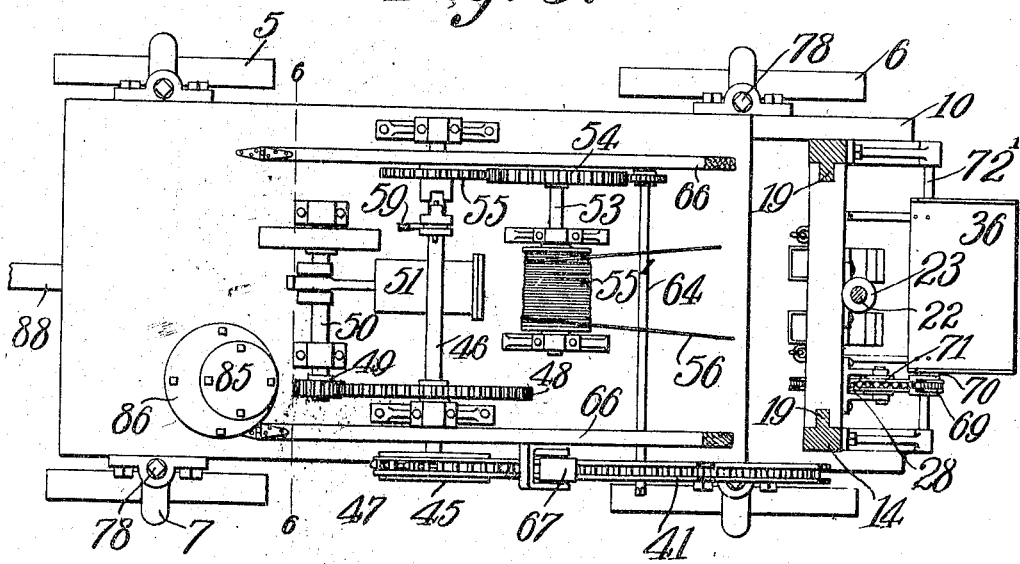
Fig. 6.
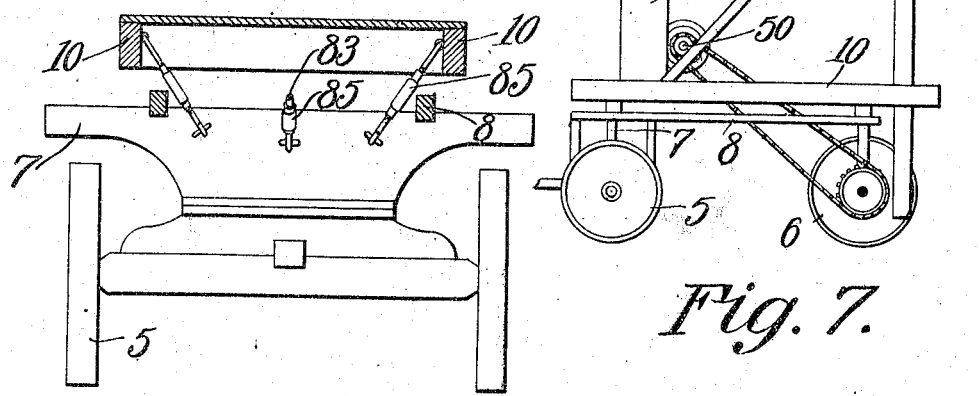
Fig. 7.
Witnesses
Inventor
Robert Guthrie.
By C. A. Snow & Co.
Attorneys

UNITED STATES PATENT OFFICE.

ROBERT GUTHRIE, OF LINCOLN, NEBRASKA.

MACHINE FOR BORING POST-HOLES.

No. 885,041.　　　　Specification of Letters Patent.　　　Patented April 21, 1908.

Application filed August 24, 1907. Serial No. 390,066.

*To all whom it may concern:*

Be it known that I, ROBERT GUTHRIE, a citizen of the United States, residing at Lincoln, in the county of Lancaster and State of Nebraska, have invented a new and useful Machine for Boring Post-Holes, of which the following is a specification.

This invention relates to machines for digging or boring post holes and has for its object to provide a strong, durable and thoroughly efficient machine of this character especially designed for making holes or excavations for the reception of telegraph or telephone poles and the like.

A further object of the invention is to provide a machine including a wheeled truck having an earth auger mounted for rotation thereon and adjustable vertically of the truck thereby to permit the auger to penetrate the ground to any desired depth.

A further object is to provide a sliding carriage having an endless carrier or conveyer associated therewith and adapted to receive the earth from the auger and discharge the same at the rear of the truck.

A further object is to provide a supporting frame upon which is mounted a sliding carriage and its associated parts, said frame being pivotally connected with the platform of the truck and capable of being swung laterally to inoperative position thereby to permit the truck to pass beneath bridges, telephone wires and other over-head obstructions.

A further object is to provide a motor mounted on the platform of the truck and operatively connected with the auger and endless conveyer, respectively for actuating the same.

A further object is to provide means for leveling the platform of the truck and means for adjusting the sliding carriage independently of the motor.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of a machine constructed in accordance with my invention. Fig. 2 is a rear elevation of the same. Fig. 3 is a side elevation of the lower portion of the foot-bracket. Fig. 4 is a perspective view of the auger bit detached. Fig. 5 is a top plan view partly in section of Fig. 1. Fig. 6 is a vertical sectional view taken on the line 6—6 of Fig. 5, parts of the machine being omitted for the sake of clearness. Fig. 7 is a detail side elevation, one of the traction wheels being removed to show the manner of gearing the truck with the motor.

Similar numerals of reference indicate corresponding parts in all of the figures of the drawings.

The improved mechanism forming the subject matter of the present invention is preferably mounted on a truck including the front and rear traction wheels 5 and 6, the bolsters 7 of which are connected by spaced longitudinal reach bars 8. Mounted above and disposed in spaced relation to the reach bars 8 is a platform 9 having its spaced longitudinal side bars or timbers 10 extending beyond one end of the platform to form anchoring members for a vertically disposed derrick or support 11 carrying an auger 12 and an endless elevator or conveyer 13.

The side bars 14 of the derrick are bolted at 15 and 16 to supporting brackets 17 secured to the upper and lower longitudinal edges of the beams 10, there being laterally extending lugs 18 secured to the brackets 17 and adapted to bear against the bars 14 for maintaining said bars in vertical position.

The support or derrick 11 is normally and rigidly supported in vertical position by the fastening devices 15 and 16 but may be moved laterally to the dotted line position shown in Fig. 1 of the drawings by removing the fastening devices 15, as will be readily understood.

Secured to the bars 14 of the derrick are longitudinal strips or guides 19 upon which is slidably mounted for vertical movement a rectangular frame or carriage 20. The carriage 20 is provided with vertically alined bearings 21 in which is mounted for rotation a vertically adjustable auger shaft 22, the latter being secured to and movable with the carriage 20 by means of spaced collars 23 disposed one on each side of the bearings 21 and engaging the adjacent cross bars of the carriage frame, as shown. Mounted in suitable bearings 24 in the carriage 20 is a transverse shaft 25 provided with spaced sprocket wheels 26 which engage the elevator link belts or chains 27 of the endless conveyer or carrier 13. The lower legs of the chains 27 engage foot sprockets 28 mounted for rotation on suitable foot shafts 29 disposed below the platform 9. One end of each foot shaft 29 is seated in a collar 30 while the opposite end thereof is journaled in the terminal T bearing 31 of a longitudinal bar or pipe 32, the longitudinal bars 32 together with the foot shafts 29 and loose collar 30 serving as a means for supporting the lower end of the endless conveyer. The upper ends of the bars 32 are provided with elongated slots 33 for the reception of suitable fastening devices 34 which engage the lower transverse beam of the carriage frame so that by adjusting the bars 32 vertically of the carriage the amount of slack in the sprocket chains 27 may be regulated at will.

Riveted or otherwise rigidly secured to the sprocket chains 27 are spaced elevator buckets 35 which serve to receive the earth from the auger 12 and deliver the same into a chute or trough 36 from whence it is discharged at the rear of the machine. The trough 36 is secured to and movable with the carriage 20, said trough being fastened in position on the carriage by suitable brackets 37.

The upper end of the auger shaft 22 is journaled in a bearing 38 on the derrick frame and is provided with a beveled gear 39 which meshes with a correspondingly beveled gear 40 carried by a stub shaft 41. The shaft 22 is keyed to the beveled gear 39 but is free to slide longitudinally of said gear when the carriage 20 moves downwardly in the act of making a hole or excavation.

The stub shaft 41 is disposed at right angles to the auger shaft 22 and is provided with spaced sprocket wheels 42 and 43 one of which is connected through the medium of a link belt or chain 44 with a sprocket wheel 45 secured to a transverse speed reducing shaft 46. The shaft 46 is mounted for rotation in suitable bearings 47 secured to the platform of the truck and is provided with a master gear 48 which engages a pinion 49 on the driving shaft 50 of a gas engine, motor or other suitable source of power, indicated at 51.

Secured to the platform 9 in advance of the engine 51 are spaced brackets 52 in which is journaled an auxiliary or drum shaft 53 carrying a gear wheel 54 which meshes with a pinion 55 on the counter shaft 46 so that motion may be transmitted from the shaft 46 to the shaft 41 for the purpose hereinafter referred to. Keyed or otherwise rigidly secured to the shaft 53 is a winding drum 55' to which are secured spaced ropes or cables 56 which pass over suitable pulleys or sheaves 57 mounted on a transverse shaft 58 on the upper portion of the derrick and thence extend downwardly for attachment to the carriage 20 so that when the drum 55' is rotated the carriage 20 together with the auger shaft may be adjusted vertically of the frame.

Mounted on the shaft 46 is a clutch 59 of any approved construction and which serves to connect the gear wheel 54 with the pinion 55 when it is desired to raise or lower the carriage.

Disposed in advance of the bracket are spaced standards 60 having their upper ends inclined or beveled at 61 to form supports for the side bars 14 of the derrick frame when said derrick is swung laterally to the dotted line position shown in Fig. 1 of the drawings, said standards or supports being reinforced and strengthened by diagonal braces 62 which connect the standards with the brackets 17, as shown.

Journaled in bearings 63 on the standards 60 is a transverse shaft having one end thereof provided with a winding head 64 while the opposite end thereof is provided with a pinion 65 which meshes with the gear wheel 54 so that when the clutch 59 is operated to disconnect the gear wheel 54 from the pinion 55 on the shaft 46 the drum 55' may be rotated to raise and lower the carriage independently of the motor, this result being accomplished by rotating the winding head with a suitable wrench provided for this purpose.

Connecting the upper portion of the derrick with the platform 9 are diagonal braces 66 to one of which is secured an idle sprocket wheel 67 adapted to engage the sprocket chain 44 so as to maintain the latter under the desired tension. The upper ends of the inclined braces 66 are detachably secured to the side bars 14 of the derrick by bolts or similar fastening devices 68 so that by removing said fastening devices the derrick may be swung laterally into engagement with the inclined ends of the standards 60, in the manner before described.

As a means for rotating the endless conveyer 13 there is provided a link belt or chain 69 which passes over the sprocket wheel 43 and thence extends downwardly over the idle sprocket wheel 70 at the bottom of the machine and thence upwardly over a corresponding idle sprocket wheel 71 for engagement with a sprocket wheel 72 secured to the transverse shaft 25 of the carriage from whence it passes upwardly to the sprocket wheel 43, as best shown in Figs. 1 and 2 of the drawing. The idle sprocket wheel 71 is secured to and movable with the carriage 20 while the lower idle sprocket wheel 70 is relatively stationary so that motion may be imparted to the elevator chains 27 regardless of the position of the carriage 20 on the derrick. The sprocket wheel 70 is mounted on a shaft 72' journaled in suitable brackets 73 carried by the adjacent ends of the side bars 14, said brackets being disposed in advance of the conveyer so as to permit free movement of the sprocket chain 69 without interfering with the buckets of the conveyer.

Secured to the lower end of the auger shaft 22 is an auger bit provided with one or more downwardly inclined shares or wings 74 which plow into the earth when the auger is rotated and deliver the earth on the upper face or the platform 75 of said auger from whence it is taken up by the buckets of the conveyer and delivered to the discharge chute 36. The auger bit is provided with a terminal screw point 76 while the lower face of the platform of said bit is provided with spaced depending cutting knives or blades 77 which govern the size and shape of the hole or excavation to be formed in the ground.

As a means for leveling the platform to permit the machine to be operated on rough uneven ground, said platform is provided with a plurality of adjusting leveling screws 78 preferably four in number, said screws being arranged on each side of the platform at the bolsters 7. The screws 78 extend through correspondingly threaded castings or sockets 79 secured to the longitudinal beams 10 of the platform and are provided with conical terminals 80 which engage correspondingly shaped bearing cups 81 secured to the adjacent bolster so that by gripping the angular heads 82 of the adjusting screws with a wrench or other suitable tool, said screws may be adjusted to tilt the platform at any angle or inclination with reference to the ground.

In order to support the platform in inclined position there are provided suitable tension rods 83, preferably six in number, one end of each of the intermediate rods of which is secured to a central transverse beam 84 while the opposite ends thereof are secured to the bolster of the wheeled truck. The side rods 83 preferably extend from the bolsters to the longitudinal bars or timbers 10, as shown. The rods 83 are provided with turn buckles 85 which may be adjusted on the rods 83 so as to maintain the platform at the desired inclination.

Mounted on the front portion of the platform is a gasolene tank 85 and a cooling tank 86 of any approved construction for supplying fuel to the gas engine, there being a tube 87 depending from the bottom of the platform beneath the gas engine or motor and constituting a muffler.

From the foregoing description it will be seen that when the motor is started motion will be transmitted through the medium of the sprocket chain 44 to the shaft 41 and thence through the medium of the sprocket 69 to the endless conveyer 13, the beveled gear 40 at the same time engaging the gear 39 and imparting motion to the auger shaft 22. The clutch 59 being actuated to disconnect the gear 54 from engagement with the pinion 55 the carriage 20 is free to travel downwardly by its own weight as the depth of the hole increases. As the auger bit is rotated the earth will be taken up by the conveyer and delivered to the chute 36 from whence it will be discharged at the rear of the machine. After the boring operation is completed the clutch 46 is actuated to rotate the drum 55 thereby to wind the cable 56 on said drum and elevate the carriage, so as to withdraw the auger and endless conveyer from the hole or excavation. When transferring the truck from place to place the lower fastening device 15 of the bracket 17 is removed and the derrick swung bodily to the dotted line position shown in Fig. 1 of the drawings and in which position it will be supported upon the inclined faces 61 of the standards, in the manner before stated.

The truck is provided with a tongue 88 for attachment to one or more draft animals but if desired, the wheels of the truck may be connected with the motor on the platform so that the motor may be used for propelling the truck, as best shown in Fig. 7 of the drawings.

From the foregoing description it is thought that the construction and operation of the device will be readily understood by those skilled in the art and further description thereof is deemed unnecessary.

Having thus described the invention what is claimed is:

1. A machine of the class described including a truck, a derrick pivotally mounted on the truck and adapted to be swung downwardly to inoperative position, a carriage slidably mounted on the derrick, a vertically adjustable auger movable with the carriage, a conveyer coöperating with the auger, and means for supporting the derrick in operative position.

2. A machine of the class described including a truck, a derrick secured to one end of the truck, a carriage slidably mounted on the derrick, an auger journaled on the carriage and movable with the latter, a conveyer suspended from the carriage, and means for simultaneously rotating the conveyer and auger.

3. A machine of the class described including a truck, a derrick secured to one end of the truck, a carriage slidably mounted on the derrick, an auger mounted for rotation on the carriage, an endless conveyer carried by said carriage, means for raising and lowering said carriage, and means for rotating the auger and conveyer, respectively.

4. A machine of the class described including a truck, a derrick secured to one end of the truck, a carriage mounted for vertical movement on the derrick, an auger journaled on and movable with the carriage, a discharge chute carried by the carriage, an endless conveyer for delivering earth to the chute, means for raising and lowering the carriage, and means for operating the auger and conveyer, respectively.

5. A machine of the class described including a truck, a derrick pivotally mounted on the truck and adapted to be swung downwardly to inoperative position, an auger carried by the derrick, an endless conveyer mounted for rotation on said derrick, and an inclined support secured to the truck and forming a rest for the derrick when the latter is in inoperative position.

6. A machine of the class described including a truck, brackets secured to the truck and provided with stop lugs, a derrick pivotally mounted between said brackets and adapted to engage the stop lugs, said derrick being arranged to swing downwardly to inoperative position, a carriage mounted on the derrick, an auger journaled on and movable with the carriage, a conveyer coöperating with the auger, means for operating the auger and conveyer, respectively, and means for supporting the derrick in inoperative position.

7. A machine of the class described including a truck having a platform, brackets secured to the upper and lower faces of the platform and each provided with a laterally extending stop lug, a derrick pivotally mounted between the brackets and adapted to be swung downwardly to inoperative position, means for supporting the derrick in vertical position, a carriage slidably mounted on the derrick, an auger movable with the carriage, a conveyer coöperating with the auger, and supports secured to the platform and having inclined terminals adapted to engage the derrick when the latter is in inoperative position.

8. A machine of the class described including a truck, a derrick carried by the truck, a carriage slidably mounted on the derrick, a transverse shaft disposed at the lower end of the derrick, an endless conveyer connecting the shaft and carriage, an auger movable with the carriage, means for rotating the auger and conveyer, respectively, and means for raising and lowering the carriage.

9. A machine of the class described including a truck, a derrick secured to the truck, a carriage slidably mounted on the derrick, an auger movable with the carriage, an endless conveyer coöperating with the auger, a winding drum, a cable connecting the drum with the carriage for raising and lowering the latter, a motor for rotating the drum, and means operatively connected with the auger and conveyer, respectively, and actuated by the motor for rotating the same.

10. A machine of the class described including a truck, a derrick secured to the truck, a carriage slidably mounted on the derrick, an auger journaled on and movable with the carriage, a conveyer coöperating with the auger, a motor operatively connected with the conveyer and auger, respectively for actuating the same, a winding drum operable by the motor, a connection between the drum and the carriage for elevating the latter, and means for rotating the drum independently of the motor.

11. A machine of the class described including a truck having a tilting platform, a derrick secured to the platform, a carriage slidably mounted on the derrick, an auger carried by the carriage, a conveyer coöperating with the auger, a motor, and means connecting the motor with the auger and conveyer, respectively for actuating the same.

12. A machine of the class described including a truck having bolsters, a platform mounted for tilting movement above the bolsters, a derrick secured to one end of the platform, a carriage mounted for vertical movement on the derrick, an auger mounted for rotation on the carriage and movable with the latter, an endless conveyer coöperating with the auger, a motor operatively connected with the auger and conveyer, respectively, for operating the same, and means carried by the platform and adapted to engage the bolsters for tilting said platform.

13. A machine of the class described including a truck having bolsters, a platform disposed above the bolsters, threaded castings secured to the platform, adjusting screws engaging the threads on the castings and bearing against the bolsters for tilting said platform, and means for locking the platform in adjusted position.

14. A machine of the class described including a truck having bolsters, a tilting platform disposed above the bolsters, a derrick secured to one end of the platform, a carriage mounted for vertical movement on the derrick, an auger carried by the carriage and movable with the latter, a conveyer coöperating with the auger, a motor secured to the platform of the truck for operating the auger and conveyer, respectively, means for raising and lowering the carriage, and adjusting screws carried by the platform and engaging the bolsters for tilting said platform.

15. A machine of the class described including a truck having bolsters, a platform mounted for tilting movement on the bolsters, a derrick secured to one end of the platform, a carriage mounted for sliding movement on the derrick, an auger carried by the carriage, and endless conveyer coöperating with the auger, a motor operatively connected with the conveyer and auger, respectively, for operating the same, adjusting screws carried by the platform and bearing against the bolsters for tilting the platform, and adjustable brace rods forming a connection between the bolsters and platform for supporting the platform in tilted position.

16. A machine of the class described including a truck, a derrick secured to one end of the truck and provided with spaced bars, a carriage slidably mounted between the bars and provided with a transverse shaft, a plurality of sprocket wheels mounted on said shaft, a hanger adjustable vertically of the carriage and provided with a transverse foot shaft, sprocket wheels secured to the foot shaft, sprocket chains engaging the sprocket wheels on the foot shaft and carriage shaft, respectively, conveyer buckets secured to the sprocket chains, an auger mounted for rotation on the carriage, means for rotating the auger, and means for rotating the transverse shaft of the carriage.

17. A machine of the class described including a truck, a derrick secured to one end of the truck, a stub shaft mounted for rotation on the upper end of the derrick and provided with spaced sprocket wheels, a carriage adjustable vertically of the derrick and provided with a transverse shaft, a sprocket wheel secured to the transverse shaft, a foot shaft provided with spaced sprockets, sprocket chains connecting the sprocket wheels on the transverse and foot shafts and provided with conveyer buckets, a connection between one of the sprocket wheels on the stub shaft and adjacent sprocket on the transverse shaft of the carriage for rotating the conveyer, an auger having a beveled gear slidably mounted thereon, a beveled gear carried by the stub shaft and engaging the beveled gear on the auger, a motor, and a sprocket chain connecting the motor and one of the sprocket wheels on the stub shaft for rotating the auger.

18. A machine of the class described including a truck, a derrick secured to one end of the truck, a carriage mounted for sliding movement on the derrick, spaced bars adjustable vertically of the carriage and having their lower ends connected by a foot shaft, a collar carried by the foot shaft, an auger shaft mounted for rotation on the carriage and extending through the collar of the foot shaft, a conveyer connecting the foot shaft and carriage, and means for operating the auger and conveyer, respectively.

19. A machine of the class described including a truck, a derrick pivotally mounted on the truck and movable laterally to inoperative position, a carriage slidably mounted on the derrick, a hanger depending from the carriage and comprising spaced bars the upper ends of which are slotted and the lower ends thereof connected by a transverse foot shaft, a collar carried by the foot shaft, an auger shaft mounted for rotation on the carriage and extending through the collar of the foot shaft, an endless conveyer connecting the foot shaft and carriage, means for rotating the auger and endless conveyer, respectively, means for supporting the derrick in vertical position, and means for supporting the derrick in inoperative position.

In testimony that I claim the foregoing as my own, I have hereto affixed my signature in the presence of two witnesses.

ROBERT GUTHRIE.

Witnesses:
R. SPRINGER,
T. J. DUNN.